United States Patent Office 3,522,929
Patented Aug. 4, 1970

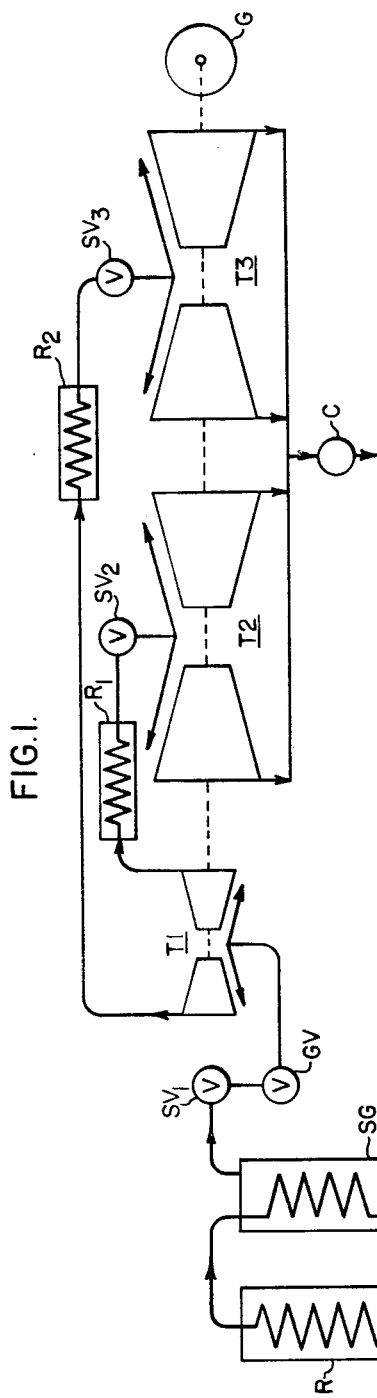
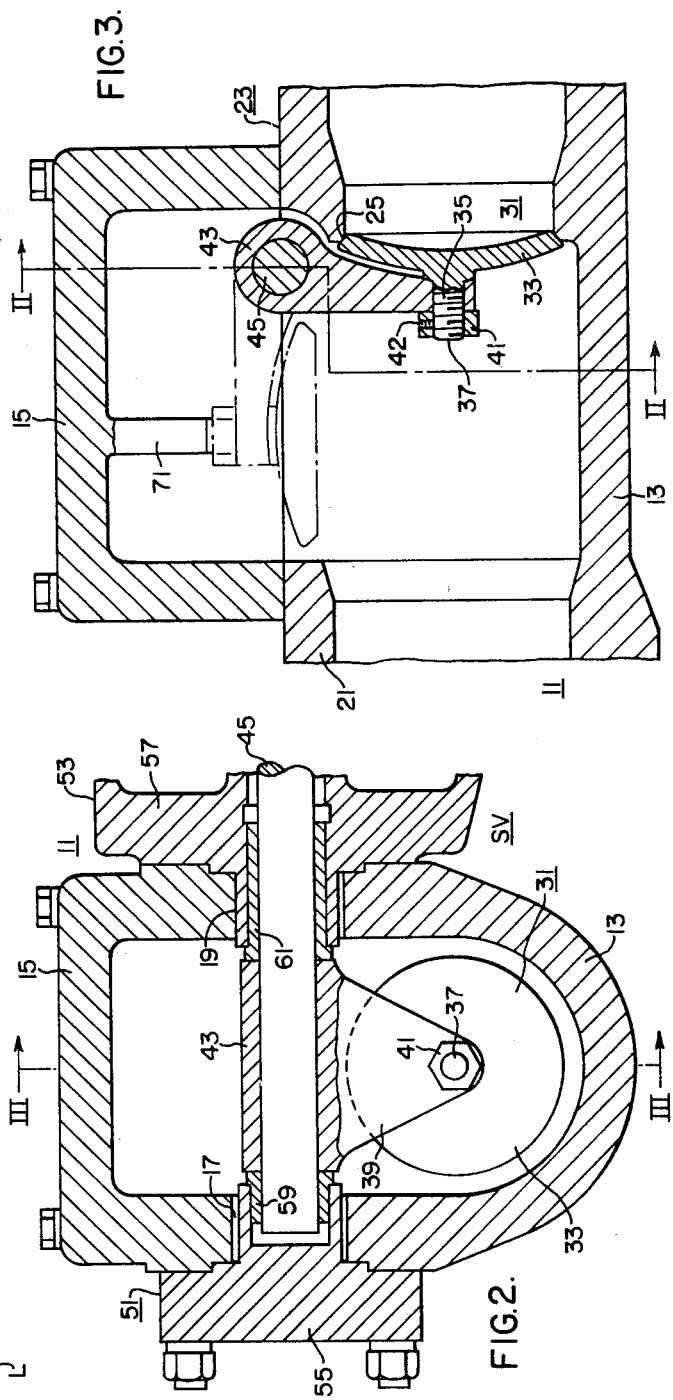

---

3,522,929
VALVE FOR CONTROLLING ELASTIC FLUID
Joseph De Simone, Parkside, Chester, Pa., assignor to Westinghouse Electric Corporation, Pittsburgh, Pa., a corporation of Pennsylvania
Filed Jan. 4, 1968, Ser. No. 695,650
Int. Cl. F04b *39/10;* F16k *1/20, 51/00*
U.S. Cl. 251—298                        1 Claim

ABSTRACT OF THE DISCLOSURE

A stop-valve SV (FIG. 1) of the clapper type for a steam-turbine power plant system (FIG. 1) in which the clapper 33 and its shaft 45 are combined into a rigid assembly 31. The valve body 11 consists of separable parts, for example a cover part 15 and a body part 13 which are abutted to form the valve body 11 and to define the openings 17 and 19 through which the bearing housings 55 and 57 for the shaft 45 extend. The parts of the bearing openings 17 and 19 in the body part 13 are unobstructed in a direction parallel to the axis of the shaft 45, so that the clapper-shaft assembly 31 with the shaft in the bearing may be mounted as a unit in the body part before the cover part is mounted and all parts secured together. The provision of keys and keyways in the clapper shaft is then avoided.

---

BACKGROUND OF THE INVENTION

This invention relates to valves for controlling the flow of pressurized elastic fluid and has particular relationship to stop valves and intercepter valves for steam-turbine power plant systems. The valves in accordance with this invention are particularly adapted to serve in turbine systems but it is to be understood that, to the extent that this invention has applicability to valves serving other purposes, such applications of this invention are within its scope.

Typically, the stop valves and interceptor valves of turbine systems available in accordance with the teachings of the prior art have axially movable closures which are seated in the valve seats by axial movement of a valve rod and also pivotal closures in which the closure or clapper is mounted on a shaft and is pivoted, with this shaft, into, or out of, engagement with the valve seat. This invention concerns itself with valves having pivotal closures or clapper valves.

A feature strikingly characteristic of stop valves and intercepter valves for turbine systems is that they are very large. In fact these valves are so large that when disposed in conduits directing partially expanded steam from higher-pressure to lower-pressure turbines, the turbine-casing dimensions are determined, not by the motive steam flow conditions in the turbines, but by the dimensions of the valves. Typically a stop or intercepter valve has a clapper about 28 inches in diameter pivotal on a shaft having a diameter of about 6 inches. The outside dimensions of the valve body of such a valve are typically about 43 inches by 55 inches by 80 inches.

In stop or intercepter valves in accordance with the teachings of the prior art, the clapper and the shaft are provided as separate components. A bearing sleeve extends on an arm from the clapper and during assembly of the valve, the shaft is thrust through the sleeve and the sleeve is keyed to the shaft. Typically there are four such keys, two in-line and two 180° apart. Since the valve controls the flow of large volumes of steam, it is essential that the clapper operate reliably. To achieve this reliability the utmost care and diligence must be exercised in constructing locking keys and keyways and they are costly and present difficulties in installation and maintenance.

It is an object of this invention to overcome the above-described disadvantages and difficulties and to provide a stop or intercepter valve of the pivotal-closure or clapper type which shall require no keys and keyways for locking the closure shaft to the closure.

SUMMARY OF THE INVENTION

This invention arises from the realization that the above-described difficulties are inherent in the manner in which the valve body is constructed. The valve body is made up of a plurality of separable parts, typically a body part and a cover part. In valves in accordance with the teachings of the prior art, the body part entirely supports the bearing load or the clapper shaft is entirely in the body part with its bearings extending through holes in the body part. It is necessary to construct the shaft as a separate component so that it may be thrust through the bearing and the clapper and bushing sleeve while the clapper, arm and sleeve are held in the valve body part.

In accordance with this invention the clapper and its shaft are formed as a unitary rigid assembly and the valve body is comprised of a plurality of separable parts, typically a body part and a cover part, such that the bearings may be thrust over the ends of the shaft of the clapper-shaft assembly and the bearings with the shaft extending through them placed in the bearing support in the body part or cover. The separable valve body parts may then be joined to complete the valve. The bearing load is carried partly by the body part and partly by the cover part.

BRIEF DESCRIPTION OF THE DRAWING

For a better understanding of the invention, both as to its organization and as to its method of operation, together with additional objects and advantages thereof, reference is made to the following description taken in connection with the accompanying drawing, in which:

FIG. 1 is a diagrammatic view showing an electrical power generating turbine system in which a valve in accordance with this invention is included;

FIG. 2 is a view in transverse section (taken along line II—II of FIG. 3) of a valve according to this invention; and FIG. 3 is a view in section taken along line III—III of FIG. 2.

DESCRIPTION OF THE PREFERRED EMBODIMENT

The system shown in FIG. 1 includes a nuclear reactor R typically of the pressurized-water type. A loop L conducts the hot pressurized water from this reactor R through a steam generator SG in heat-exchange relationship with the water therein. The steam from generator SG passes into a high-pressure turbine T1 through a stop valve $SV_1$ and a governor valve GV. The governor valve GV is employed primarily to regulate motive steam flow in response to load conditions, and both the $SV_1$ and GV valves are employed to shut-off the steam to turbine T1 on the occurrence of one of the many events requiring steam shut-off. Typical of such events are sudden loss of load, malfunction of a critical unit and the like.

After partial expansion in the turbine T1, which may be a double-flow turbine, a part of the steam is passed through a combined moisture separator and reheater $R_1$ and thence through a stop valve $SV_2$ to a double-flow low pressure turbine T2. The other part of the steam from turbine T1, in a similar manner, is passed through a combined moisture separator and reheater $R_2$ and thence through a stop valve $SV_3$ to another double-flow low pressure turbine T3. It is essential that the valves $SV_1$, and $SV_3$ operate positively reliably to stop the steam flow in the turbine system when they receive a closing signal from the control system. If they fail, the large volume of steam from SG expanding through T1 and from $R_1$ and $R_2$ expanding through T2 and T3 may cause the rotor to accelerate to speed in excess of design limits. The governor valve GV operates first in response to a signal from the control system a subsequent signal then operates the SV valves; if valve GV fails to operate by reason of a malfunction, the flow of steam is positively stopped by the SV valves.

The spent steam from the turbines T2 and T3 then passes into a condenser C and the resulting water is pumped back into the steam generator SG. Intercepter valves (not shown) may also, if desired, be interposed between the moisture separator and reheaters $R_1$ and $R_2$ and the low-pressure turbines T2 and T3, respectively.

FIGS. 2 and 3 show the valve SV in detail. The structure shown in these views covers the valves $SV_1$, $SV_2$, and $SV_3$ and includes a valve body 11 composed of separable parts, a body part 13 and a cover part 15. The parts 13 and 15 are separated in a horizontal place extending axially through the bearing openings 17 and 19 through which the clapper shaft 45 and its bearing assemblies 51 and 53 extend and when abutted to form the housing, define these openings 17 and 19.

The valve 11 includes an inlet port 21 and an outlet port 23. The outlet port has an annular valve seat 25.

The valve 11 also includes a clapper-shaft assembly 31 which is combined into a rigid unit. This assembly includes a clapper 33 having a central mounting stud 35 with a threaded end 37. A clapper arm 39 is secured to the stud 35 by a nut 41 which is held securely by a set screw 42. A bearing sleeve 43 extends from the arm 39; the sleeve 43 is integral with the arm 39 or is otherwise permanently secured to the arm. The sleeve 43 is secured to the clapper shaft 45; it may be sweated, welded or shrunk onto the shaft 45.

The valve SV has bearing assembles 51 and 53. Each of these bearing assemblies 51 and 53 include a bearing housing 55 and 57, respectively, having flanges by which it is secured both to the cover part 15 and the body part 13 of the valve body 11 and bushings 59 and 61, respectively, in which the shaft 45 is rotatable. The housings 55 and 57 penetrate into the valve body through the openings 17 and 19 which are formed by abutting the separable body part 13 and cover part 11. The part of the opening 17 and 19 in one of the parts, typically the body part 13, subtend an angle of at least 180°. The clapper assembly 31 and bearing assemblies may then be assembled outside of the valve body and placed in the body part 13. The cover part 15 may then be abutted with the body part 13 and the bearing housings 55 and 57 secured to the adjacent walls of the abutting parts 13 and 15. The cover part 15 and the body part 13 then supports the bearing load.

In the use of the valve SV, the shafts 45 are normally turned so that the clappers 33 are in the open position shown in broken lines in FIG. 3 with the end 37 of the stud 35 engaging a stop 71. On the occurrence of a malfunction in the turbine system or for any other reason, when it becomes necessary to interrupt the flow of steam, the shaft 45 is turned so that the clapper 33 seats on the valve seat 25. The flow of the steam is then positively interrupted.

I claim as my invention:
1. A valve for controlling the motive elastic fluid flow in a turbine system, including a valve body having an inlet port and an outlet port; said outlet port having a closure seat, a closure member suspended from a shaft, bearing means for said shaft in which said closure member and shaft are pivotally movable about an axis coaxial with said shaft from a position in which said closure member engages said seat to close said outlet port, to a position in which said closure member is disengaged from said seat to open said outlet port, said closure member and shaft being combined into a rigid unitary assembly mountable as a unit with said bearing means in said valve body, said valve body being divided in a plane extending axially through opposed openings into a body part and a cover part to receive the bearings for the shaft, and further including a pair of opposed bearing housing members of annular shape extending about said opposed openings and carrying the bearings, and means for connecting each of said bearing housings to said body part and cover part of the divided valve body.

References Cited
UNITED STATES PATENTS

| | | | |
|---|---|---|---|
| 1,856,138 | 5/1932 | Ruemelin | 251—298 |
| 2,105,282 | 1/1938 | Dolby | 251—298 |
| 2,302,695 | 11/1942 | Kalix | 251—301 |
| 2,852,037 | 9/1958 | Downing et al. | 251—298 XR |

HENRY T. KLINKSIEK, Primary Examiner

U.S. Cl. X.R.

251—367